United States Patent
Shimizu et al.

(10) Patent No.: US 7,378,772 B2
(45) Date of Patent: May 27, 2008

(54) ROTOR FOR PERMANENT MAGNET MOTOR

(75) Inventors: Haruhiko Shimizu, Wako (JP); Teruyoshi Kita, Wako (JP); Takayuki Higashi, Wako (JP); Shigeki Muroga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 10/541,327

(22) PCT Filed: Jan. 21, 2004

(86) PCT No.: PCT/JP2004/000452

§ 371 (c)(1),
(2), (4) Date: Jun. 30, 2005

(87) PCT Pub. No.: WO2004/068673

PCT Pub. Date: Aug. 12, 2004

(65) Prior Publication Data

US 2006/0043810 A1    Mar. 2, 2006

(30) Foreign Application Priority Data

Jan. 28, 2003  (JP) .............................. 2003-018854
Jan. 31, 2003  (JP) .............................. 2003-023179

(51) Int. Cl.
*H02K 21/12*  (2006.01)
(52) U.S. Cl. ................................ 310/156.08; 310/218
(58) Field of Classification Search ..............
310/156.01–156.84, 261, 262, 218
See application file for complete search history.

(56) References Cited

U.S. PATENT DOCUMENTS 6,127,764 A * 10/2000 Torok .......................... 310/269
6,557,239 B2 * 5/2003 Takahashi et al. ............. 29/596
6,972,499 B2 * 12/2005 Emoto .......................... 310/12

FOREIGN PATENT DOCUMENTS

| FR | 2 556 519 |   | 6/1985 |
| GB | 2 262 288 A |   | 6/1993 |
| JP | 5508361 | * | 6/1980 |
| JP | 4-101640 |   | 4/1992 |

(Continued)

OTHER PUBLICATIONS

Translation of JP 55-86361.*

*Primary Examiner*—Dang Le
*Assistant Examiner*—Nguyen Hanh
(74) *Attorney, Agent, or Firm*—Arent Fox LLP (57) ABSTRACT

A metal film 4 is disposed between a permanent magnet 3 and a rotor yoke 1, and the permanent magnet 3 and the rotor yoke 1 are subjected to beam welding. Since the metal film 4 is disposed between the permanent magnet 3 and rotor yoke 1, and the metal film 4 as a laser beam irradiated portion is melted by vacuum beam or laser beam, the metal film 4 has brazing metal function in welding, so that the connection between the permanent magnet 3 and the rotor yoke 1 is strong. Since there is no need of embedding the permanent magnet 3 in the rotor yoke 1 and there is no need to use polymer adhesives, the cost can be reduced.

5 Claims, 6 Drawing Sheets

FOREIGN PATENT DOCUMENTS

| | | |
|---|---|---|
| JP | 06-038415 | 2/1994 |
| JP | 07-177712 | 7/1995 |
| JP | 08-080015 | 3/1996 |
| JP | 08-223835 | 8/1996 |
| JP | 2002-272033 | 9/2002 |

* cited by examiner

Fig. 3 laser beam welded portion

Fig. 4A  Fig. 4B

Fig. 5 laser beam welded portion

ROTOR FOR PERMANENT MAGNET MOTOR

CROSS-REFERENCE TO RELATED APPLICATION

This application is a National Stage entry of International Application No. PCT/JP2004/000452, filed Jan. 21, 2004, the entire specification claims and drawings of which are incorporated herewith by reference.

TECHNICAL FIELD

The present invention relates to a rotor for a permanent magnet type motor, and in particular relates to a rotor in which connection strength between a rotor yoke and a permanent magnet, etc., is improved.

BACKGROUND ART

In rotors used in permanent magnet type motors used as power sources for automobiles, various kinds of techniques have been proposed in order to improve characteristics relating to durability, cost, magnetic efficiency, heat dissipation, and connection strength between a rotor yoke and a permanent magnet, etc., in accordance with intended use.

In the above rotors for permanent magnet type motors, for example, a technique has been proposed, in which a permanent magnet is embedded in a rotor yoke so as to improve durability (for example, see Japanese Unexamined Patent Application Publication No. Hei 6-38415). A technique has been proposed, in which a rotor yoke and a permanent magnet are connected to each other by sintering so as to improve magnetic efficiency and heat dissipation (for example, see Japanese Unexamined Patent Application Publication No. Hei 7-177712). A technique is proposed, in which a rotor yoke and a permanent magnet are connected by using an adhering technique by polymer material so as to reduce the cost and improve the connection strength therebetween (for example, see Japanese Unexamined Patent Application Publication No. 2002-272033).

However, in the rotor disclosed in the above Japanese Unexamined Patent Application Publication No. Hei 6-38415, a rotor is relatively high in cost since the rotor yoke is disposed between permanent magnets so that the rotor is double in radius, and magnetic efficiency based on air gap between the rotor and a stator is low since the permanent magnet is not exposed on a surface of the rotor. In the rotor disclosed in the above Japanese Unexamined Patent Application Publication No. Hei 7-177712, the rotor is relatively high in cost due to manufacturing equipment used in a powder metallurgy method, the connection strength at high temperature and at high speed rotation and the durability including thermal shock are low since sintering connection without an adhering medium is adopted, and manufacturing cannot be performed when the yoke has a stacked structure since a powder metallurgy method cannot be applied thereto. In the rotor disclosed in the above Japanese Unexamined Patent Application Publication No. 2002-272033, the durability of the rotor is lowered since adhesives composed of a polymer are softened at temperatures during the use of the rotor, and heat dissipation from the permanent magnet to the rotor yoke is low since adhesives for permanent magnet have thermal conductivity lower than metal films, so that heat does not dissipate to a side of the rotor. In the rotor disclosed in the above Japanese Unexamined Patent Application Publication No. 2002-272033, when the adhesives composed of the polymer material are used, magnetic efficiency based on air gap between the rotor and a stator and magnetic efficiency based on the included gap between the permanent magnet and the rotor yoke are low.

Therefore, in recent years, techniques have been required such that all characteristics regarding the durability, the cost, the magnetic efficiency based on the air gap between the rotor and the stator, the magnetic efficiency based on the included gap between the permanent magnet and the rotor yoke, the heat dissipation, and the connection strength between the rotor yoke and the permanent magnet favorably reach high levels.

DISCLOSURE OF THE INVENTION

The present invention was made in consideration of the above requirements, and an object of the present invention is to provide a rotor for a permanent magnet type motor which allows the above various characteristics, for example, the durability, etc., to favorably reach high levels.

The present invention provides a rotor for a permanent magnet type motor including: a rotor yoke; a permanent magnet connected on a surface of the rotor yoke; and a metal film which is disposed between the rotor yoke and the permanent magnet, wherein the rotor yoke and the permanent magnet are subjected to beam welding.

In the rotor for a permanent magnet type motor, the metal film is disposed between the permanent magnet and the rotor yoke, so that the metal film as a beam irradiated portion is melted by vacuum beam or laser beam, the melted metal film functions as a brazing filler metal in welding, and the connection between the permanent magnet and the rotor yoke is thereby strong. As a result, the connection strength and the durability including thermal shock at high temperature and at high speed rotation can be improved. A difference in thermal expansion rate between the rotor yoke generally composed of an iron type material and the metal film composed of, for example, copper, is small, and the metal film deforms itself, functions as a buffer between the permanent magnet and the rotor yoke in welding. As a result, the metal film absorbs the rotor yoke's expansion and compression under large temperature change, and the thermal durability can thereby be improved.

In the rotor for a permanent magnet type motor of the present invention, it is unnecessary to embed a permanent magnet as in the rotor disclosed in the above Japanese Unexamined Patent Application Publication No. Hei 6-38415, and it is unnecessary to use adhesives composed of polymer materials as in the rotor disclosed in the above Japanese Unexamined Patent Application Publication No. 2002-272033, and the cost can thereby be reduced. Since it is unnecessary to use adhesives composed of polymer materials, an undesirable odor is not generated by the connecting, it is unnecessary to execute coating processes, etc., and the workability is good.

In the rotor for a permanent magnet type motor of the present invention, since the permanent magnet is exposed on a surface of the rotor, magnetic efficiency based on air gap between the rotor and a stator is high. Since the metal disposed between the permanent magnet and the rotor yoke can have a thinner thickness by plating or thermal spraying in comparison with a case of using adhesives of polymer materials, magnetic efficiency based on the included gap between the permanent magnet and the rotor yoke is high. When beam welding is performed in connecting between the permanent magnet and the rotor yoke, heat is applied only to microscopic area of connection interface between the permanent magnet and the rotor yoke during welding, magnetic characteristics of the permanent magnet do not deteriorate.

In the rotor for a permanent magnet type motor of the present invention, in a case in which an eddy current is generated in the permanent magnet in use, thermal conductivity of the metal film disposed between the permanent magnet and the rotor yoke is large, heat dissipation from the permanent magnet to the rotor yoke is high, and stable use can thereby be realized. Since powder metallurgy methods are not used, a rotor having a stacked structure can be produced.

According to the rotor for a permanent magnet type motor of the present invention, all characteristics of the durability, the cost, the magnetic efficiency based on air gap between the rotor and the stator, the magnetic efficiency based on the included gap between the permanent magnet and the rotor yoke, the heat dissipation, and the connection strength between the rotor and the permanent magnet favorably reaches high levels.

In the rotor for a permanent magnet type motor, the above metal film is favorably formed on a surface of the permanent magnet. According to the present invention, the entire surface of the permanent magnet of the magnet film can be inexpensively and easily covered with the metal film before the permanent magnet is connected to the rotor yoke by beam welding in comparison with a vacuum deposition method and a sputtering method, and corrosion of the permanent magnet and damage to the surface of the magnet can be effectively prevented.

In the rotor for a permanent type magnet motor, a thickness of the above metal film is favorably 25 to 90 μm.

In this rotor for a permanent magnet type motor of the present invention, since the thickness of the metal film is not less than 25 μm, the above strong connection can be adequately effective. Since the thickness of the metal film is not more than 90 μm, it is unnecessary to use the metal film excessively, so that the cost can be reduced adequately.

In this rotor for a permanent magnet type motor, the above metal film is favorably composed of at least one of nickel and copper. According to the present invention, since the metal film contains nickel, which is superior in corrosion, or copper, which is superior in thermal conductivity, at least of one of corrosion-resistance of the permanent magnet and heat dissipation from the permanent magnet to the rotor yoke can be improved. Nickel and copper can be respectively used as a simple substance. Each of nickel and copper can be formed into one layer, so that the metal film can have two layers. Alternatively, the metal film can be composed of an alloy of nickel and copper.

In this rotor for a permanent magnet type motor, the rotor yoke favorably has a stacked structure. In this structure, when the metal film is melted during beam welding, a melted metal film is infiltrated slightly in gaps among disc-shaped tips of the rotor yoke, the connection between the permanent magnet and the rotor yoke is thereby stronger, and connection strength at high temperature and at high speed rotation and durability including thermal shock can be improved.

BEST MODE FOR CARRYING OUT THE INVENTION (1) First Embodiment

A production example of a rotor for a permanent magnet type motor of the present invention will be explained with reference to Figures hereinafter.

Figure 1:
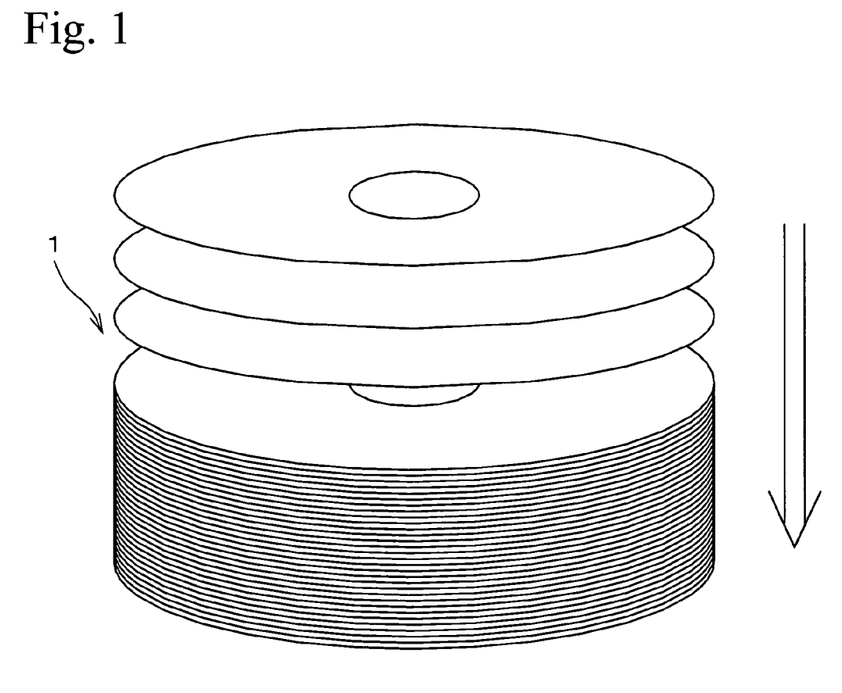
FIG. 1 is a perspective view showing a production example of a rotor yoke used in a rotor for a permanent magnet type motor of the First Embodiment according to the present invention.
Figure 2:
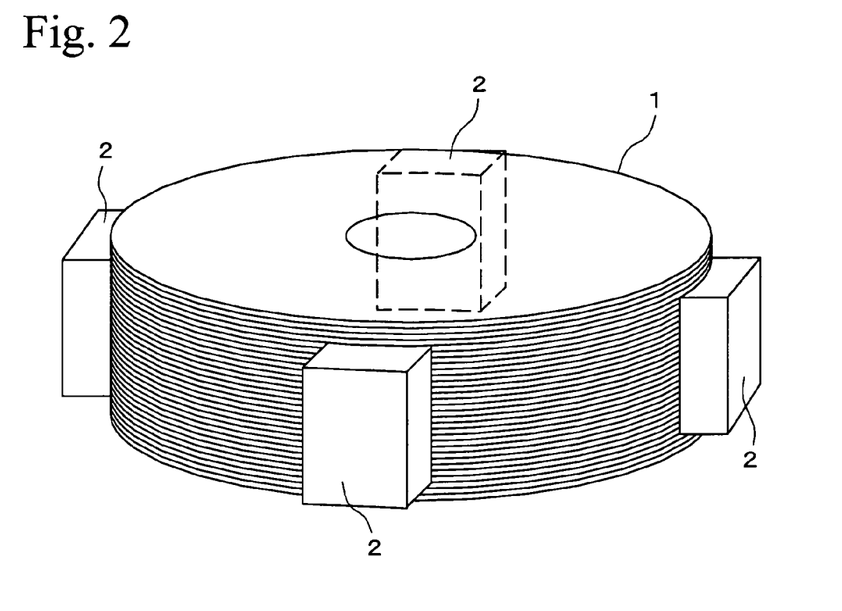
FIG. 2 is a perspective view showing a production example of a rotor for a permanent magnet type motor of the First Embodiment according to the present invention.

In a case in which a rotor for a permanent magnet type motor of the present invention is produced, plural disc-shaped tips composed of an iron type material are layered in turn, so that a rotor yoke 1 is formed. Next, as shown in FIG. 2, a predetermined number (in FIG. 2, four) of copper plated permanent magnets 2, which are produced such that copper plating is performed on an entire face thereof beforehand, are connected to a peripheral face of the rotor yoke 1.

Figure 3:
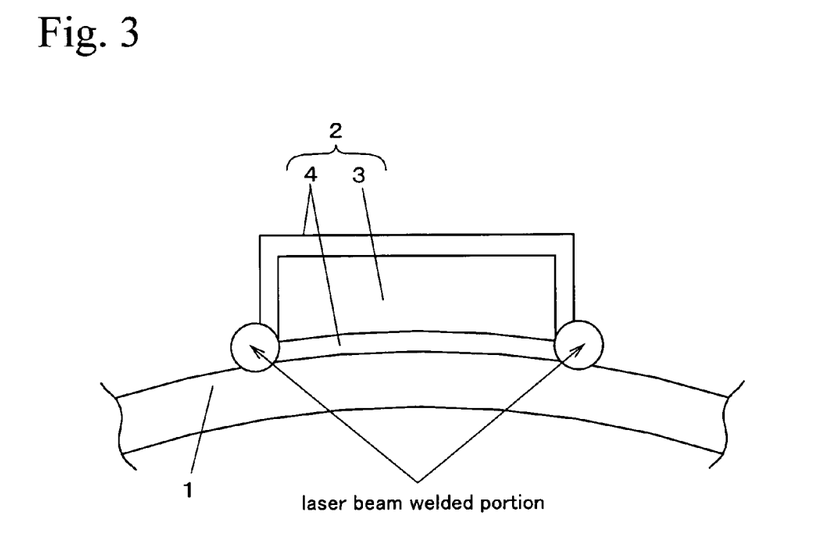
FIG. 3 is a plane diagram showing a connection feature between a plated permanent magnet and a rotor yoke of the First Embodiment according to the present invention.

FIG. 3 is a plane diagram showing a connected portion between the rotor yoke 1 and the copper plated permanent magnet 2. As described above, the copper plated permanent magnet 2 is structured such that an overall face of a permanent magnet 3 composed of a Nd—Fe—B type rare earth magnet is covered with a copper plated film 4 beforehand as shown in FIG. 3. This copper plated permanent magnet 2 is disposed on the peripheral face of the rotor yoke 1, and welding by laser beam is performed thereon.

Figures 4A, 4B:
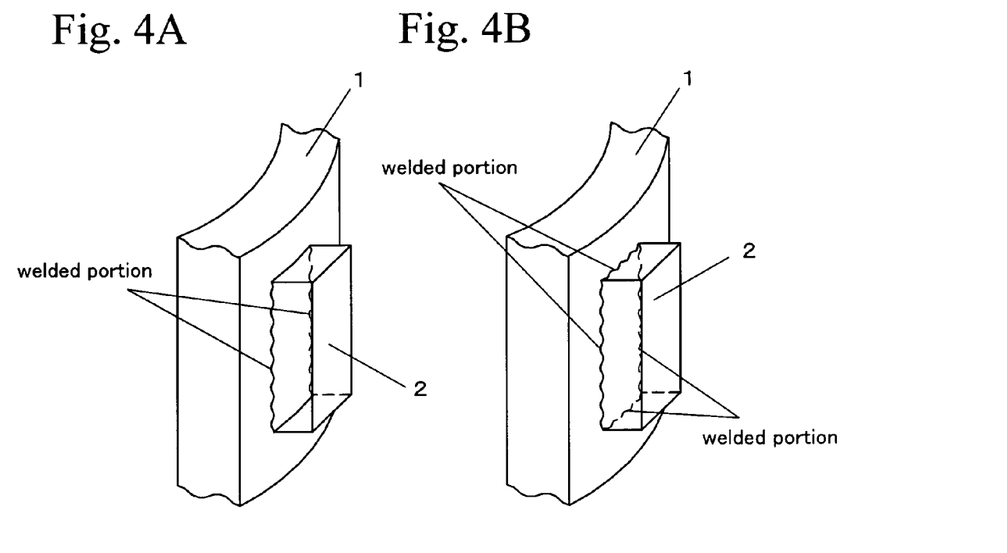
FIG. 4A is a perspective view showing one example of a beam weld feature between a plated permanent magnet shown in FIG. 3 and a rotor yoke.
FIG. 4B is a perspective view showing another example of a beam weld feature between a plated permanent magnet shown in FIG. 3 and a rotor yoke.

FIG. 4A is a perspective diagram showing one example of a beam weld feature between the plated permanent magnet 2 and the rotor yoke 1. According to the example shown in FIG. 4A, a welded portion by laser beam is a part (wavy line portions in FIG. 4A) of a periphery of contact face between the rotor yoke 1 and the copper plated permanent magnet 2. In contrast, FIG. 4B is a perspective diagram showing another example of a beam weld feature between the rotor yoke 1 and the copper plated permanent magnet 2. According to the example in FIG. 4B, a welded portion by laser beam is an overall periphery (wavy line portion in FIG. 4B) of a contact face between the rotor yoke 1 and the copper plated permanent magnet 2.

When welding by laser beam is performed in accordance with the connection features shown in FIGS. 3, 4A and 4B, the copper plated film 4 as a laser beam irradiated portion is melted, the copper plated film 4 serves as a brazing filler metal in welding, so that connection between the rotor yoke 1 and the permanent magnet 3 is strong in FIG. 3. Therefore, the connection strength at high temperature and at high speed and the durability including thermal shock can be improved. In particular, when a welded portion by laser beam is an overall of a periphery of contact face between the rotor yoke 1 and the copper plated permanent magnet 2 as shown in FIG. 4B, the above connection is stronger and the durability can be improved more. In FIG. 3, since thermal expansion rate difference between the rotor yoke 1 composed of an iron type material and the copper plated film 4 is small, and the copper plated film 4 is deformed and is relaxed, the copper plated film 4 serves as a buffer between the rotor yoke 1 and the permanent magnet 3, elastic deformation of the rotor yoke 1 is prevented under large temperature change, and thermal durability can be improved.

In the rotors for magnet type motors shown in FIGS. 3, 4A and 4B, since the rotors are not structured such that the copper plated permanent magnets 2 are embedded and are not structured such that adhesives are used, the cost can be reduced. In addition, magnetic efficiency based on air gap between the rotor and the stator is high since the copper plated permanent magnet 2 is exposed on a surface of the rotor yoke 1, and magnetic efficiency based on the included gap between the rotor yoke 1 and the permanent magnetic 3 since thickness of the copper plated film 4 between the rotor yoke 1 and the permanent magnet 3 is extremely thin in comparison with a case in which an adhesive composed of a polymer is used.

Furthermore, in the rotors for a permanent magnet type motor shown in FIGS. 3, 4A and 4B, when an eddy current is generated in the permanent magnet 3 during the use of the rotor, the copper plated plate 4 between the rotor yoke 1 and the permanent magnet 3 has large thermal conductivity, so that heat dissipation from the permanent magnet 3 to the rotor yoke 1 is high, and the stable use of the rotor is realized.

(2) Second Embodiment

Figure 5:
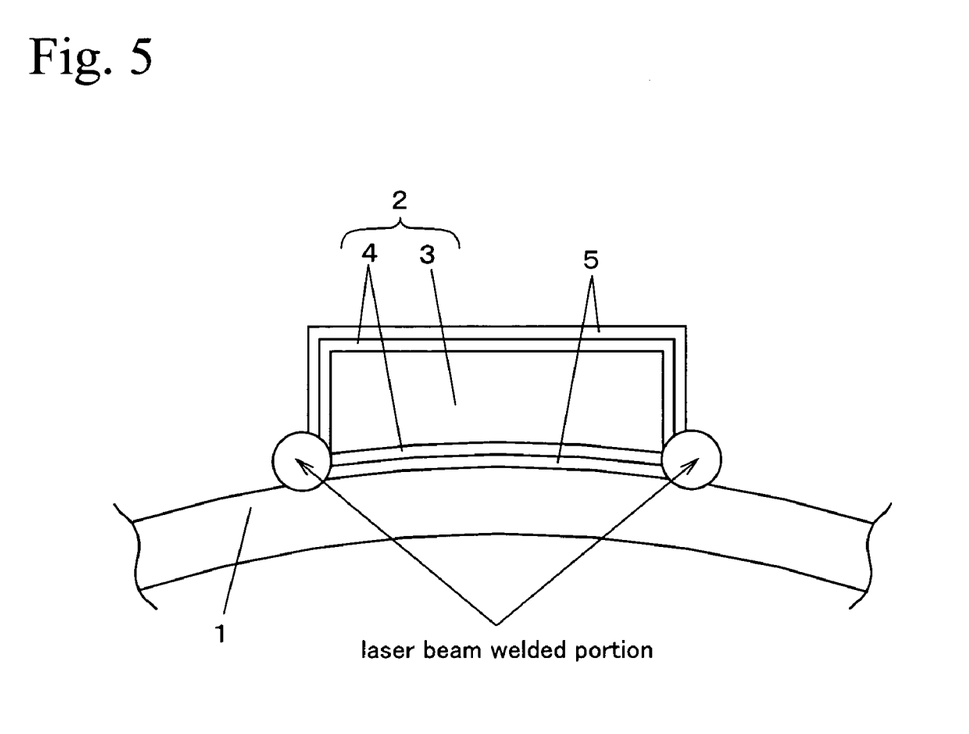
FIG. 5 is a plane diagram showing a connection feature between a plated permanent magnet and a rotor yoke of the Second Embodiment according to the present invention.

A production example of a rotor for a permanent magnet type motor of the Second Embodiment will be explained with reference to FIG. 5 hereinafter. FIG. 5 is a plane diagram showing the detailed connection feature between the rotor yoke 1 and the plated permanent magnet 2 shown in FIG. 2. In the Second Embodiment, the same numeral references as in the First Embodiment denote the same structural elements as in the First Embodiment, and explanations of the structural elements and the actions thereof are omitted.

In the Second Embodiment, the plated permanent magnet 2 is structured such that an overall face of the permanent magnet 3 composed of a Nd—Fe—B type rare earth magnet is covered with a copper plated film 4 having a thickness of 30 μm, and a periphery of the copper plated film 4 is covered with a nickel plated film 5 having a thickness of 30 μm. As shown in FIG. 5, an outside of the copper plated film is favorably covered with the nickel plated film 5 in order to sufficiently have good durability of nickel. As shown in FIG. 5, the plated permanent magnet 2 formed in the above manner is disposed on a peripheral face of the rotor yoke 1, and then welding by laser beam is performed thereat.

When welding by laser beam is performed in the same manner as in the First Embodiment in accordance with the connection features shown in FIGS. 4A, 4B, and 5, the copper plated film 4 and the nickel plated film 5 as laser beam irradiated portions are melted, the films 4 and 5 serve as brazing filler metals in welding, so that connection between the rotor yoke 1 and the permanent magnet 3 in FIG. 5 is strong. In particular, since in the rotor in FIG. 5, the copper plated film 4 and the nickel plated film 5 have a thickness of not less than 25 μm in total, the above strong connection can be sufficiently achieved. In the Second Embodiment, since the plated film has two layers of the copper plated film 4 and the nickel plated film 5, the rotor can have good thermal conductivity of copper and good durability of nickel.

In the rotor for magnet type motors, since the rotor is not structured such that the copper plated permanent magnet 2 is embedded and is not structured such that adhesives of polymer materials are used, the cost can be reduced. In addition, since the rotor in FIG. 5, the copper plated film 4 and the nickel plated film 5 have a thickness of not more than 90 μm in total, the metal films are not excessively used, and the cost can be thereby reduced sufficiently.

Furthermore, in the rotors for a permanent magnet type motor shown in FIGS. 4A, 4B, and 5, even when an eddy current is generated in the permanent magnet 3 during the use of the rotor, heat dissipation from the permanent magnet 3 to the rotor yoke 1 is high and the stable use of the rotor is realized since the copper plated film 4 between the rotor yoke 1 and the permanent magnet 3 has large thermal conductivity.

EXAMPLES

Results of respective performance evaluations of the rotor for a permanent magnet type motor of the present invention are shown hereinafter. The respective performance evaluation tests were performed assuming rotors for permanent magnetic type motors produced in accordance with the connection features shown in FIGS. 3 and 4A or the connection features shown in FIGS. 4A and 5. A permanent magnet was composed of a Nd—Fe—B type rare earth metal, an overall surface of the permanent magnet was plated with at least one of copper and nickel, and a rotor yoke member was composed of an iron type material.

Since an object of the present invention is that all characteristics regarding the durability, the cost, the magnetic efficiency based on the air gap between the rotor and the rotor stator, the magnetic efficiency based on the included gap between the permanent magnet and the rotor yoke, the heat dissipation, and the connection strength between the rotor yoke and the permanent magnet reach high levels as described above, evaluation tests for all these characteristics are desirable to perform. However, in the rotor for permanent magnet motors of the present invention, since a structure in which the copper plated permanent magnet is embedded is not used and adhesives are not used, the cost can obviously be reduced. In addition, since adhesives are not used, the magnetic efficiency based on the air gap between the rotor and the stator is obviously good, and the magnetic efficiency based on the included gap between the rotor yoke and the permanent magnetic is obviously good. Furthermore, since the metal film is used instead of the above adhesives as a connection medium between the rotor yoke and the permanent magnet, the heat dissipation from the permanent magnet to the rotor yoke is expected to be high. Therefore, characteristics other than the above respective characteristics, that is, evaluation test results regarding the connection strength between the rotor yoke and the permanent magnet are shown in the following Examples. The connection strength at high temperature and at high speed rotation and the durability including thermal shock can be anticipated from the above results of the connection strength between the rotor yoke and the permanent magnet.

(A) Comparison of a Case of Using a Metal Film as a Connection Medium and a Case of Using an Epoxy Resin Example 1

Figure 6A:
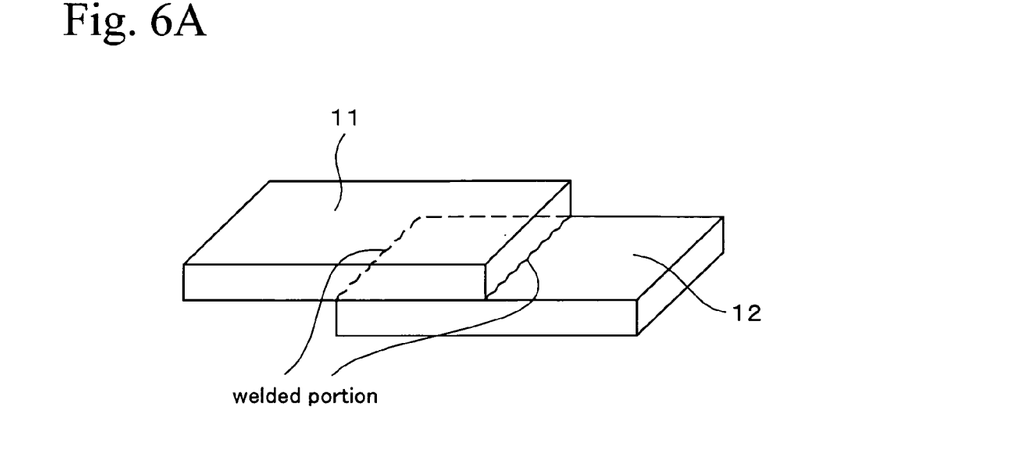
FIG. 6A is a perspective view showing one example of a feature in which a rotor yoke member and a plated permanent magnet are connected by laser beam joining.

A rotor yoke member 11 of an iron type material and a plated permanent magnet 12 of a Nd—Fe—B type rare earth magnet plated with silver having a thickness of 50 μm on an entire face thereof were prepared, and laser beam welding was performed at a part (wavy line portion in the Figure) of a periphery on a contact face between the rotor yoke 11 and the plated permanent magnet 12 in a state in which these were contacted to each other as shown in FIG. 6A. Next, as shown in FIG. 6C, tension shear test based on JIS K 6850 was performed on the rotor yoke 11 and the plated permanent magnet 12 which were connected. "Autograph AG-5000 with high temperature vessel" of product of SHIMADZU Co. was used as a test apparatus, and tension shear test was performed at each temperature of −20° C., 25° C., 140° C., and 200° C., and performed at tension speed of 5 mm/min.

Comparative Example 1

Figure 6B:
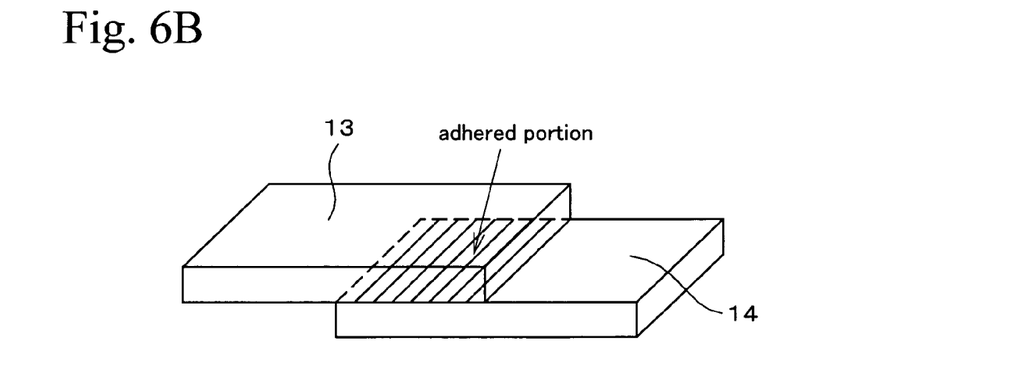
FIG. 6B is a perspective view showing one example of a feature in which a rotor yoke material and a plated permanent magnet are adhered by coating epoxide adhesive.
Figure 6C:
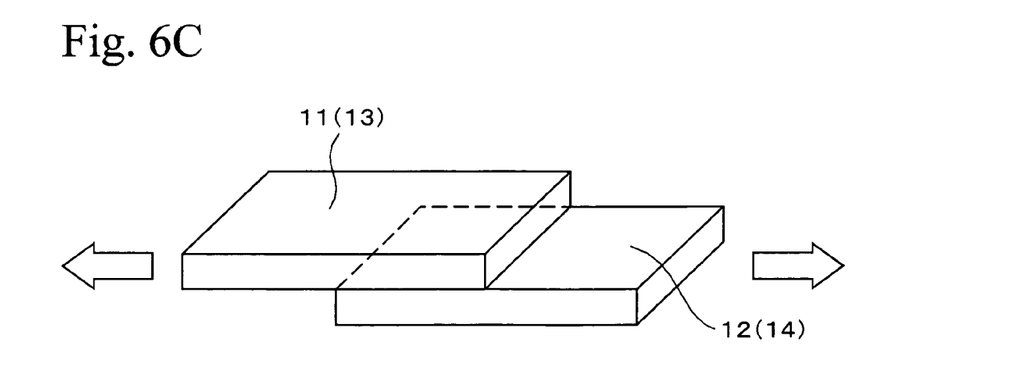
FIG. 6C is a perspective view showing a state in which tension shear test is performed on the rotor yoke and the plated permanent magnet (the permanent magnet) which are adhered as shown in FIG. 6A or 6B.

A rotor yoke member 13 of an iron type material and a permanent magnet 14 of a Nd—Fe—B type rare earth magnet were prepared, and, as shown in FIG. 6B, epoxy adhesive (product of BRENNY GIKEN Co.) was coated on an entire contact face therebetween at a thickness of 80 μm, so that these were adhered. Next, in the same manner as in Example 1, tension shear test based on JIS K 6850 was performed on the rotor yoke 13 and the plated permanent magnet 14 which were connected. Respective test conditions were the same as in Example 1.

Comparative Example 2

A rotor yoke material 13 of an iron type material and a permanent magnet 14 of a Nd—Fe—B type rare earth magnet were prepared, and, as shown in FIG. 6B, an epoxy adhesive (product of "Bond E Set"of product of KONISHI Co., LTD.) was coated on an entire contact face therebetween at a thickness of 80 μm, so that these were adhered. Next, in the same manner as in Example 1, tension shear test based on JIS K 6850 was performed on the rotor yoke 13 and the plated permanent magnet 14 which were connected. Respective test conditions were the same as in Example 1. The above evaluation test results regarding Example 1 and Comparative Examples 1 and 2 are shown in FIG. 7.

Figure 7:
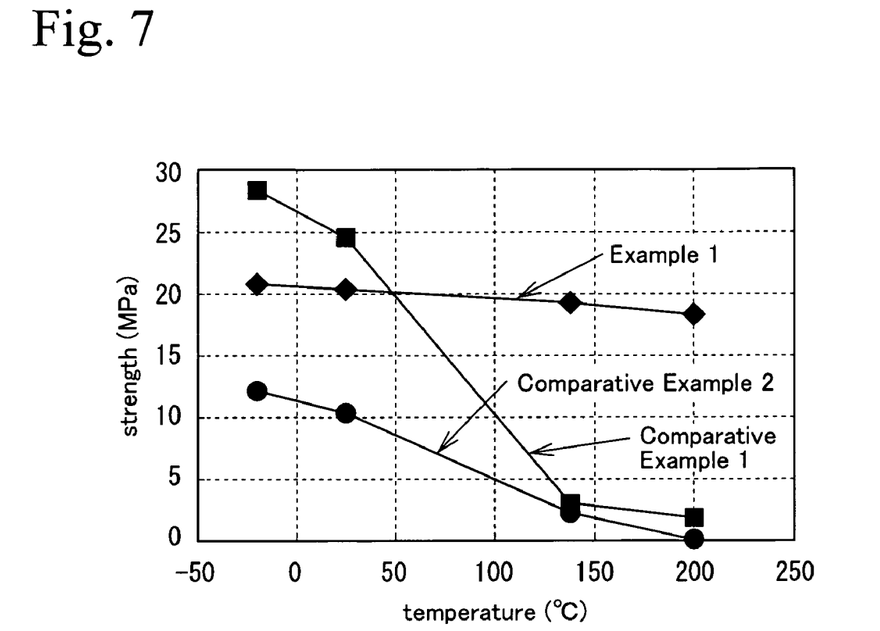
FIG. 7 is a graph showing evaluation results of Example 1 and Comparative Examples 1 and 2.

As shown in FIG. 7, almost the same strength can be obtained at a temperature ranging from −20° C. to 200° C. in Example 1. Therefore, a rotor corresponding to Example 1 can be stably used at all temperature regions during use. In contrast, in Comparative Example 1, sufficient connection strength was obtained at the low temperature side, but connection strength was remarkably lowered at the high temperature side. Therefore, a rotor corresponding to Comparative Example 1 cannot be used at high temperature region during use. In Comparative Example 2, sufficient connection strength cannot be obtained at both low temperature side and high temperature side. Therefore, a rotor corresponding to Comparative Example 2 cannot be used at all temperature regions during use. In consideration of the above results of connection strength between a rotor yoke and a permanent magnet, connection strength and durability including thermal shock at high temperature and at high speed are good in Example 1 and are not good in respective Comparative Examples.

(B) Heat Dissipation from Permanent Magnet to Rotor Yoke

Since heat dissipation from a permanent magnet to a rotor yoke depends on thermal conductivity of the entirety of the rotor, this thermal conductivity was examined.

Example 2

A rotor yoke material 11 of an iron type material and a plated permanent magnet 12 of a Nd—Fe—B type rare earth magnet plated with copper on an entire face thereof, and laser beam welding was performed at a part (wave line in the Figure) of a periphery of contact face between the rotor yoke 11 and the plated permanent magnet 12 in a state in which these were contacted to each other as shown in FIG. 6A. Next, thermal conductivity at the connection portion in the Figure was measured by laser flash method based on JIS R 1611.

Comparative Example 3

A rotor yoke material 13 of an iron type material and a permanent magnet 14 of a Nd—Fe—B type rare earth magnet were prepared, and, as shown in FIG. 6B, an epoxy adhesive (product of BRENNY GIKEN Co.) was coated on an entire contact face so as to adhere them. Next, thermal conductivity at a connection portion in the connection portion was measured by laser flash method based on JIS R 1611.

As results of the above thermal conductivity measurements, in Example 2, thermal conductivity exhibited high values of 50 to 400 w/m·K. This is because there is a contact portion of the metals by including the copper plated film between the permanent magnet and the rotor yoke. Therefore, in Example 2, good heat dissipation is realized. On the other hand, in Comparative Example 3, thermal conductivity exhibited very low values of 0.1 to 0.9 w/m·K. This is because heat accumulates in the resin portion by including the epoxy resin between the permanent magnet and the rotor yoke so that good thermal conductivity is not realized. Therefore, in Comparative Example 3, good heat dissipation is not realized.

(C) Connection Strength in Case in which Metal Film has Copper Plated Film and Thickness of Copper Plated Film Varies Examples 3 to 7

Each rotor was produced by connecting each plated permanent magnet of a rare earth magnet having copper plating (each thickness of 30 μm (Example 3), 40 μm (Example 4), 50 μm (Example 5), 60 μm (Example 6), and 80 μm (Example 7)) to a rotor yoke (outside diameter of 170 mm, thickness of 55 mm) of an iron type material by laser beam welding. Next, in each rotor, tension shear test based on JIS K 6850 was performed on the rotor yoke and the permanent magnet which were connected to each other. Respective test conditions were the same as in Example 1. Tension shear test performance temperature was 200° C. Removal of the permanent magnet from the rotor yoke was examined by rotating each rotor at 8000 rpm for 30 minutes.

Comparative Examples 4 and 5

Each rotor was produced by connecting each plated permanent magnet of a rare earth magnet having copper plating (each thickness of 20 μm (Comparative Example 4) and 100 μm (Comparative Example 5)) to a rotor yoke (outside diameter of 170 mm, thickness of 55 mm) of an iron type material by laser beam welding. Next, in each rotor, tension shear test based on JIS K 6850 was performed on the rotor yoke and the permanent magnet which were connected to each other. Respective test conditions were the same as in Example 1. Tension shear test performance temperature was 200° C. Removal of the permanent magnet from the rotor yoke was examined by rotating each rotor at 8000 rpm for 30 minutes.

Figure 8:
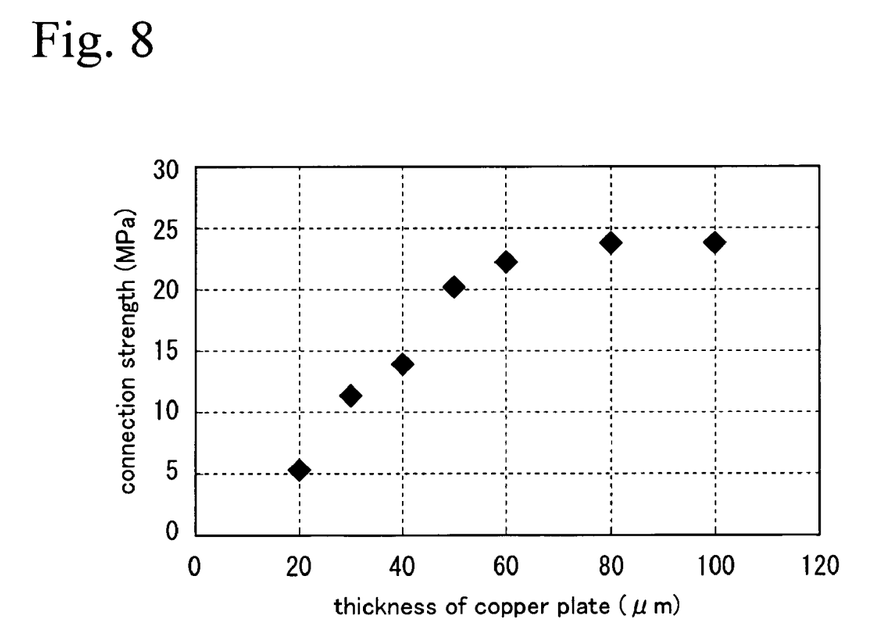
FIG. 8 is a graph showing results of tension shear tests regarding Examples 3 to 7 and Comparative Examples 4 and 5.

FIG. 8 is a graph showing results of tension shear tests regarding Examples 3 to 7 and Comparative Examples 4 and 5. According to the Figure, in Examples 3 to 7, as the thickness of copper plating increases, connection strength increases, so that these Examples are favorable from the point of view of production cost. Since loss of the permanent magnet from the rotor yoke did not occur when the rotor was rotated in the above manner in Examples 3 to 7, it was confirmed that sufficient connection strength for use was obtained.

In contrast, in Comparative Example 4, since removal of the permanent magnet from the rotor yoke occurred when the rotor was rotated in the above manner, sufficient connection strength for use was not obtained, so that the Comparative Example 4 is not desirable example. In Comparative Example 5, as shown in FIG. 8, however the thickness of copper plating is increased more than in Example 7, and connection strength did not increase, so that it was not favorable from the point of view of production cost. As shown above, in consideration of results of connection strength, etc. of Examples 3 to 7 and Comparative Examples 4 and 5, favorable range of metal film thickness is 25 to 90 μm as described in claim 3 of the application.

(D) Connection Strength in Case in which Metal Film has at Least One of Copper Plated Film and Nickel Plated Film and Thickness of Each Plated Film Varies with Thickness of All Plated Film Fixed Each rotor was produced by connecting a plated permanent magnet, which was structured such that a permanent magnet of rare earth magnet of Nd—Fe—B type was plated with copper (each thickness of 50 μm (Example 8), 40 μm (Example 9), 30 μm (Example 10), 20 μm (Example 11), 10 μm (Example 12), and 0 μm (Example 13)) and was plated with nickel (each thickness of 0 μm (Example 8), 10 μm (Example 9), 20 μm (Example 10), 30 μm (Example 11), 40 μm (Example 12), and 50 μm (Example 13)) thereon, to a rotor yoke (outside diameter of 170 mm, thickness of 55 mm) of an iron type material, by laser beam welding. Next, in each rotor, tension shear test based on JIS K 6850 was performed on the rotor yoke and the permanent magnet which were connected to each other. The results are shown in FIG. 9.

Figure 9:
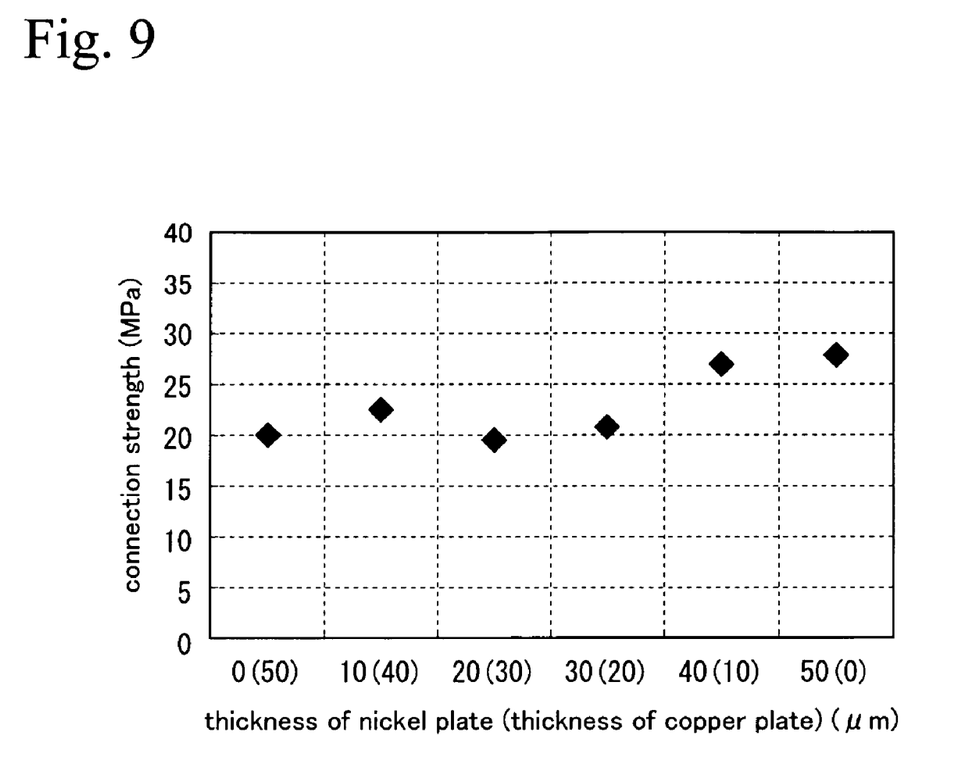
FIG. 9 is a graph showing results of tension shear tests regarding Examples 8 to 13.

According to FIG. 9, it is confirmed that, in Examples 8 to 13, connection strength desirable for use is obtained in view of FIG. 8. It is confirmed that connection strength is almost unaffected when thickness of copper plating and nickel plating varies with entire metal film thickness fixed.

The invention claimed is:

1. A rotor for a permanent magnet type motor, comprising:
   a rotor yoke having a stacked structure;
   a permanent magnet connected on an outer radial peripheral surface of the rotor yoke; and
   a metal film which encompasses an entire outer surface of the permanent magnet and is also disposed between the rotor yoke and the permanent magnet,
   wherein the rotor yoke and the permanent magnet are subjected to beam welding at least a portion of a periphery of a contact surface between the permanent magnet and the rotor yoke.

2. The rotor for a permanent magnet type motor according to claim 1,
   wherein the rotor yoke and the permanent magnet are subjected to the beam welding an entire periphery of the contact surface between the permanent magnet and the rotor yoke.

3. The rotor for a permanent magnet type motor according to claim 1, wherein the metal film has a thickness of 25 to 90 μm.

4. The rotor for a permanent magnet type motor according to claim 1, wherein the metal film contains at least of one of nickel and copper.

5. The rotor for a permanent magnet type motor according to claim 4, wherein the metal film has a copper film composed of copper and a nickel film composed of nickel.

* * * * *